United States Patent
Peng et al.

(10) Patent No.: US 9,747,897 B2
(45) Date of Patent: Aug. 29, 2017

(54) IDENTIFYING SUBSTITUTE PRONUNCIATIONS

(71) Applicant: Google Inc., Mountain View, CA (US)

(72) Inventors: Fuchun Peng, Cupertino, CA (US); Francoise Beaufays, Mountain View, CA (US); Pedro J. Moreno Mengibar, Jersey City, NJ (US); Brian Patrick Strope, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 508 days.

(21) Appl. No.: 14/109,316

(22) Filed: Dec. 17, 2013

(65) Prior Publication Data

US 2015/0170642 A1 Jun. 18, 2015

(51) Int. Cl.
*G10L 15/28* (2013.01)
*G10L 15/187* (2013.01)
*G10L 15/00* (2013.01)
*G10L 15/22* (2006.01)
*G10L 15/02* (2006.01)

(52) U.S. Cl.
CPC .......... *G10L 15/187* (2013.01); *G10L 15/005* (2013.01); *G10L 2015/025* (2013.01); *G10L 2015/227* (2013.01)

(58) Field of Classification Search
CPC combination set(s) only.
See application file for complete search history.

(56) References Cited

U.S. PATENT DOCUMENTS 5,170,432 A * 12/1992 Hackbarth ............. G10L 15/07
704/254
6,078,885 A * 6/2000 Beutnagel ............. G10L 15/063
704/231
(Continued)

OTHER PUBLICATIONS

'Wikipedia' [online]. "American and British English pronunciation differences," Jul. 8, 2014, [retrieved on Jul. 14, 2014]. Retrieved from the Internet: http://en.wikipedia.org/wiki/American_and_British_English_pronunciation_differences, 20 pages.
(Continued)

*Primary Examiner* — Jialong He
(74) *Attorney, Agent, or Firm* — Fish & Richardson P.C.

(57) ABSTRACT

Methods, systems, and apparatus, including computer programs encoded on a computer storage medium, including selecting terms; obtaining an expected phonetic transcription of an idealized native speaker of a natural language speaking the terms; receiving audio data corresponding to a particular user speaking the terms in the natural language; obtaining, based on the audio data, an actual phonetic transcription of the particular user speaking the terms in the natural language; aligning the expected phonetic transcription of the idealized native speaker of the natural language with the actual phonetic transcription of the particular user; identifying, based on the aligning, a portion of the expected phonetic transcription that is different than a corresponding portion of the actual phonetic transcription; and based on identifying the portion of the expected phonetic transcription, designating the expected phonetic transcription as a substitute pronunciation for the corresponding portion of the actual phonetic transcription.

22 Claims, 6 Drawing Sheets

(56) References Cited

U.S. PATENT DOCUMENTS

| | | | |
|---|---|---|---|
| 6,085,160 A | 7/2000 | D'hoore et al. | |
| 6,389,394 B1 | 5/2002 | Fanty | |
| 7,113,908 B2* | 9/2006 | Goronzy | G10L 15/07 704/244 |
| 7,266,495 B1 | 9/2007 | Beaufays et al. | |
| 7,280,963 B1 | 10/2007 | Beaufays et al. | |
| 8,700,396 B1* | 4/2014 | Mengibar | G10L 15/063 704/235 |
| 8,959,020 B1* | 2/2015 | Strope | G10L 15/187 704/257 |
| 9,135,912 B1* | 9/2015 | Strope | G10L 15/063 |
| 9,275,635 B1* | 3/2016 | Beaufays | G10L 15/32 |
| 2002/0173966 A1* | 11/2002 | Henton | G06F 17/273 704/277 |
| 2004/0148161 A1* | 7/2004 | Das | G10L 15/07 704/224 |
| 2004/0210438 A1* | 10/2004 | Gillick | G10L 15/005 704/254 |
| 2005/0197837 A1* | 9/2005 | Suontausta | G10L 15/005 704/260 |
| 2006/0143008 A1* | 6/2006 | Schneider | G10L 15/063 704/251 |
| 2006/0206331 A1* | 9/2006 | Hennecke | G10L 15/187 704/254 |
| 2006/0224384 A1* | 10/2006 | Dow | G10L 15/005 704/257 |
| 2007/0198265 A1* | 8/2007 | Yao | G10L 15/144 704/254 |
| 2007/0294082 A1* | 12/2007 | Jouvet | G10L 15/005 704/231 |
| 2008/0147404 A1 | 6/2008 | Liu | |
| 2009/0157402 A1* | 6/2009 | Lin | G10L 15/187 704/254 |
| 2010/0312560 A1* | 12/2010 | Ljolje | G10L 15/07 704/254 |
| 2012/0078630 A1* | 3/2012 | Hagen | G09B 19/06 704/254 |
| 2012/0179694 A1* | 7/2012 | Sciacca | G06F 17/30672 707/748 |
| 2012/0203553 A1* | 8/2012 | Maruta | G10L 13/08 704/243 |
| 2012/0278061 A1* | 11/2012 | Weinstein | G10L 15/005 704/2 |
| 2013/0132069 A1 | 5/2013 | Wouters et al. | |
| 2013/0189652 A1 | 7/2013 | Marttila | |
| 2013/0226576 A1 | 8/2013 | Jaiswal et al. | |
| 2015/0161985 A1* | 6/2015 | Peng | G10L 15/26 704/235 |
| 2015/0170642 A1* | 6/2015 | Peng | G10L 15/187 704/235 |
| 2015/0340034 A1* | 11/2015 | Schalkwyk | G10L 15/26 704/235 |

OTHER PUBLICATIONS

Hickey, "22 Maps that show how Americans speak English totally differently from one another," Business Insider, Jun. 5, 2013, http://www.businessinsider.com/22-maps-that-show-the-deepest-linguistic-conflicts-in-america-2013-6#the-pronunciation-of-caramel-starts-disregarding-vowels-once-you-go-west-of-the-ohio-river-1, 1 page.

* cited by examiner

IDENTIFYING SUBSTITUTE PRONUNCIATIONS

FIELD

The present disclosure relates to Automated Speech Recognition (ASR).

BACKGROUND

Different people, e.g. people from different geographic locations, may pronounce the same term in different ways. For instance, pronunciation of the term "caramel" differs for people across the United States—people in the eastern United States tend to annunciate the second "a" in the word "caramel," while people in the western United States tend to drop that vowel when pronouncing the word. In another example, one group of people may pronounce the term "badger" to sound like "bad-jah", while another group of people may pronounce the term "badger" to sound like "bad-jer."

SUMMARY

According to some innovative aspects of the subject matter described in this specification, a system can be trained to associate an actual pronunciation of the term for a particular group of users that use similar pronunciations with an expected pronunciation of the term for the group of users. An actual pronunciation of a term can include a manner in which members for the particular group typically pronounce the term in a given language, and an expected pronunciation of the term can include a manner in which a native speaker in the given language who does not have an accent would pronounce the term. For example, for a particular group that pronounces a "-ger" sound at the end of a term as a "-jah" sound, the system can identify utterances including "-jah" sounds at the end of the term and associate an expected pronunciation for the term, that is a "-ger" sound at the end of the term. Additionally, the system can replace the actual pronunciation, or a portion of the pronunciation, with the expected pronunciation, before processing an utterance, e.g., using an automated speech recognizer. For example, for the particular group, upon detection of an utterance including the "-jah" sound at the end of a different term, the system replaces the "-jah" sound with an expected "-ger" sound at the end of that term.

In some examples, the system can replace actual pronunciations of a term with an expected pronunciation of the term on an individual level, e.g., by storing the expected pronunciation for the term for each individual. In some examples, the system can replace actual pronunciations of a term with an expected pronunciation of the term on a group level, e.g., by storing a pronunciation confusion matrix for each group.

Innovative aspects of the subject matter described in this specification may be embodied in methods that include the actions of selecting one or more terms; obtaining an expected phonetic transcription of an idealized native speaker of a natural language speaking the one or more terms; receiving audio data corresponding to a particular user speaking the one or more terms in the natural language; obtaining, based on the audio data, an actual phonetic transcription of the particular user speaking the one or more terms in the natural language; aligning the expected phonetic transcription of the idealized native speaker of the natural language with the actual phonetic transcription of the particular user; identifying, based on aligning the expected phonetic transcription of the idealized native speaker with the actual phonetic transcription of the particular user, a portion of the expected phonetic transcription that is different than a corresponding portion of the actual phonetic transcription; and based on identifying the portion of the expected phonetic transcription, designating the expected phonetic transcription as a substitute pronunciation for the corresponding portion of the actual phonetic transcription.

Other embodiments of these aspects include corresponding systems, apparatus, and computer programs, configured to perform the actions of the methods, encoded on computer storage devices.

These and other embodiments may each optionally include one or more of the following features. For instance, storing data of a mapping between the substitute pronunciation and the corresponding portion of the actual phonetic transcription for the term in a database. Selecting further includes providing, on a user interface, a representation of the one or more terms to the particular user; receiving a confirmation from the particular user that the representation of the one or more terms correspond to the actual phonetic transcription; and associating the one or more terms with the actual phonetic transcription. Associating the one or more terms with the actual phonetic transcription further includes storing data of a mapping between the one or more terms and the actual phonetic transcription in a database. The representation of the one or more terms is provided in response to receiving the audio corresponding to the particular user speaking the one or more terms in the natural language. The one or more terms include names of one or more contacts of the particular user. Receiving data identifying one or more characteristics associated with the particular user; generating an identifier based on at least one of the one or more characteristics; and associating the identifier with the substitute pronunciation. Associating the identifier with the substitute pronunciation further comprising storing data of a mapping between the substitute pronunciation and the identifier in a confusion matrix. Assigning the identifier to the particular user. The one or more characteristics include one or more of a geographic location, a family name, an origin group, and a like-pronunciation group.

The features further include identifying a mapping between the substitute pronunciation and an actual pronunciation for the corresponding portion of the actual phonetic transcription; associating the mapping with the identifier; and storing the association and the mapping in a confusion matrix. Obtaining the expected phonetic transcription further includes identifying one or more rules associated with the one or more terms; and generating the expected phonetic transcription based on the one or more rules. Obtaining the expected phonetic transcription further includes identifying a phonetic transcription dictionary, the phonetic transcription dictionary including one or more mappings between one or more terms and one or more expected phonetic transcriptions of the one or more terms; and identifying a particular mapping of the one or more mappings of the phonetic transcription dictionary between the one or more terms and the expected phonetic transcription. The portion of the expected phonetic transcription includes a sequence of at least three phonemes. Receiving additional audio data corresponding to the particular user speaking one or more additional terms in the natural language, the one or more additional terms including the corresponding portion of the actual phonetic transcription; identifying the substitute pronunciation; and obtaining, based on the additional audio data and the substitute pronunciation, a text-based transcription of the additional audio data corresponding to the particular user speaking the one or more additional terms in the natural language.

The features further include receiving data of one or more characteristics associated with the particular user; identifying the identifier that is associated with the one or more characteristics; and based on identifying the identifier that is associated with the one or more characteristics, identifying the substitute pronunciation associated with the identifier. Obtaining the text-based transcription of the additional audio data further includes obtaining, based on the additional audio data, an additional actual phonetic transcription of the particular user speaking the one or more additional terms in the natural language; identifying an additional portion of the additional actual phonetic transcription that corresponds to the corresponding portion of the actual phonetic transcription; replacing the additional portion of the additional actual phonetic transcription with the substitute pronunciation; and based on the replacing, obtaining an updated phonetic transcription of the additional audio data corresponding to the particular user speaking the one or more additional terms in the natural language. The text-based transcription is a text-based transcription of the updated phonetic transcription of the additional audio data corresponding to the particular user speaking the one or more terms in the natural language. Providing the text-based transcription of the updated phonetic transcription of the additional audio data corresponding to the particular user speaking the one or more terms in the natural language to a user interface manager. Providing the text-based transcription of the updated phonetic transcription of the additional audio data corresponding to the particular user speaking the one or more terms in the natural language as a search query to a search engine. Designating the expected phonetic transcription as the substitute pronunciation for the portion of the corresponding actual phonetic transcription for a particular group of users, the particular group of users including the particular user.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
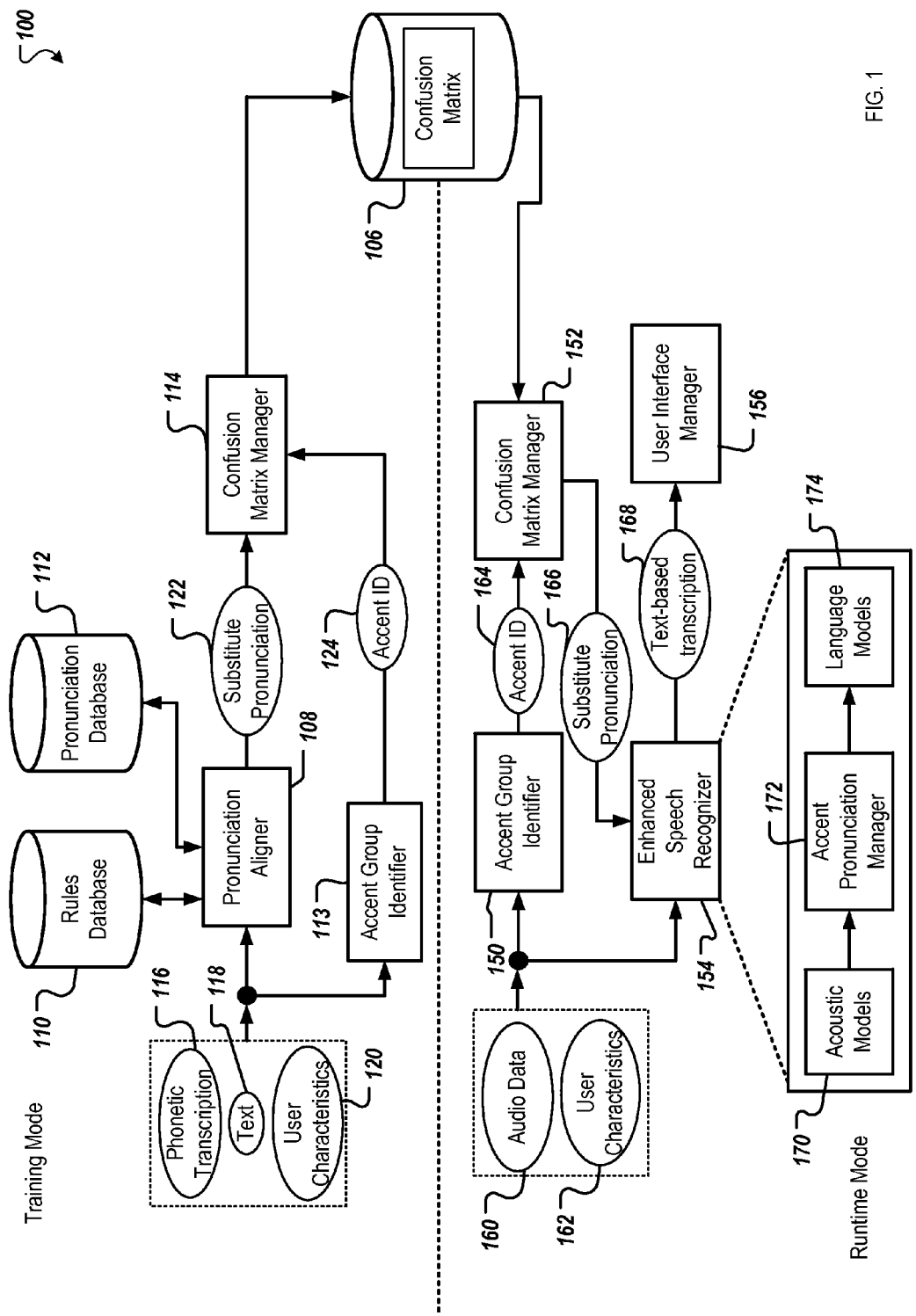
FIG. 1 depicts an example system for identifying a substitute pronunciation for replacement in an actual phonetic transcription of a term.

FIG. 1 depicts a system 100 for identifying a substitute pronunciation for replacement in an actual phonetic transcription of a term by a user. In some examples, the system 100 can operate in a training mode. In some examples, the system 100 can operate in a runtime mode. In general, when the system 100 operates in the training mode, the system 100 is trained to associate a received pronunciation of a term, or a portion of the term, by a user of a given language belonging to a particular like-pronunciation group with an expected pronunciation of those terms by an idealized native speaker in the given language. Additionally, in general, when the system 100 operates in the runtime mode, the system 100 replaces the actual pronunciation of the term, or the portion of the term, with the expected pronunciation when receiving audio data from a user belonging to the particular like-pronunciation group.

The system 100 includes a confusion matrix database 106, a pronunciation aligner 108, a rules database 110, a pronunciation database 112, an accent group identifier 113, and a confusion matrix manager 114. The system 100 further includes an accent group identifier 150, a confusion matrix manager 152, an enhanced speech recognizer 154, and a user interface manager 156. In some examples, the accent group identifier 150 is substantially the same as the accent group identifier 113, and the confusion matrix manager 152 is substantially the same as the confusion matrix manager 114.

In some implementations, audio data from a user speaking terms in a natural language is received. In some examples, the pronunciation aligner 108 receives the audio data. The audio data can include waveform data of the user speaking the term in the natural language. For example, the user speaks the term that a mobile computing device detects, e.g., through an audio detection mechanism of the mobile computing device.

Based on the received audio data, an actual phonetic transcription 116 of the user speaking the term in the natural language is received. In some examples, the actual phonetic transcription 116 includes a sequence of sounds, snippets, or phonemes that compose a particular word. In some examples, the mobile computing device can include a phonetic transcription mechanism to generate the actual phonetic transcription 116. However, in some examples, the mobile computing device can provide the audio data to a back-end server computing system, and receive in response, the actual phonetic transcription 116 of the user speaking the term.

In some further implementations, the pronunciation aligner 108 further receives a text-based transcription 118 of the term. Specifically, in some examples, a representation of the term can be provided to the user on a user interface. For example, the user speaks the term that the mobile computing device detects and a voice-recognition software application running on the mobile computing device can process the utterance to provide an initial text-based transcription of the user's utterance. The mobile computing device can provide the initial text-based transcription on a graphical user interface of the mobile computing device, e.g., on a display; or the mobile computing device can audibly provide the initial text-based transcription to the user, e.g., through a speaker of the mobile computing device. In some examples, a confirmation is received from the user that the representation of the term corresponds to the actual phonetic transcription that the user spoke. For example, the user selects a prompt on the display of the mobile computing device confirming that the representation of the term corresponds to what the user was speaking, i.e., the actual phonetic transcription. In addition, for example, the user can audibly speak the confirmation that the mobile computing device detects as the conformation.

In some examples, the term is associated with the actual phonetic transcription. For example, data of a mapping, i.e., the association, is stored between the term and the actual phonetic transcription in a database. In some examples, the user can provide an indication that the representation of the term does not correspond to the actual phonetic transcription. In response, the mobile computing device can prompt the user to provide text-based input of the term the user spoke, e.g., through a tactile keyboard or virtual keyboard. In some examples, the mobile computing device can provide a list of one or more terms for display on the user interface that the user speaks to generate the text-based transcription 118 of the one or more terms.

In some examples, the representation of the term is provided in response to receiving the audio data from the particular user speaking the term in the natural language. That is, the user initially speaks the term, and in response to detection of the utterance by the mobile computing device, the mobile computing device provides the representation of the term on the user interface of the mobile computing device. In some examples, the term can include contacts of the user, e.g., names of friends of the user that the user has associated contact information.

In some implementations, an expected phonetic transcription of an idealized native speaker of the natural language speaking the term is obtained. Specifically, the pronunciation aligner 108 obtains the expected phonetic transcription. For example, the pronunciation aligner 108 is in communication with the rules database 110 and the pronunciation database 112. The rules database 110 stores data of rules associated with terms, e.g., rules associated with the English language. For example, when the actual phonetic transcription 116 is received, the pronunciation aligner 108 can identify a particular rule of the rules database 110 that includes the expected phonetic transcription of a portion of the actual phonetic transcription. The pronunciation database 112 stores a phonetic transcription dictionary. The phonetic transcription dictionary includes data of mappings between terms and expected phonetic transcriptions of the terms. In some examples, the pronunciation aligner 108 identifies a particular mapping of the mappings that is between the term, e.g., the text-based transcription 118 of the term, and the expected phonetic transcription of the term.

In some implementations, the expected phonetic transcription 116 of the idealized native speaker of the natural language is aligned with the actual phonetic transcription of the particular user. Specifically, the pronunciation aligner 108 aligns the expected phonetic transcription of the term with the actual phonetic transcription of the term. In some examples, the alignment can include aligning speech frames, or snippets, between the expected phonetic transcription and the actual phonetic transcription. In some examples, alignment can include identifying speech frames, or snippets, based on context, e.g., surrounding phonemes, and aligning the speech frames based on the context.

In some implementations, based on the aligning of the expected phonetic transcription of the idealized native speaker with the actual phonetic transcription 116 of the user, a portion of the expected phonetic transcription is identified that is different than a corresponding portion of the actual phonetic transcription 116. Specifically, the pronunciation aligner 108 identifies, based on the aligning, a portion of the expected phonetic transcription that is different from a corresponding portion of the actual phonetic transcription 116. For example, the portion of the expected phonetic transcription can include a sequence of phonemes, e.g., three phonemes. The sequence of phonemes of the expected phonetic transcription can differ from a corresponding sequence of phonemes of the actual phonetic transcription 116, e.g., one or more phonemes differing. For example, for a three-phoneme sequence, a central phoneme of the expected phonetic transcription can differ from a corresponding central phoneme of the corresponding sequence of phonemes of the actual phonetic transcription 116. Additionally, for example, the two adjacent contextual phonemes of the expected phonetic transcription do not differ from the corresponding adjacent contextual phonemes of the corresponding sequence of phonemes of the actual phonetic transcription 116. In some examples, the portion of the expected phonetic transcription can include an entire portion of the expected phonetic transcription.

In some implementations, based on identifying the portion of the expected phonetic transcription, the expected phonetic transcription is designated as a substitute pronunciation 122 for the corresponding portion of the actual phonetic transcription 116. Specifically, the pronunciation aligner 108 designates the substitute pronunciation 122 for the corresponding portion of the actual phonetic transcription 116. In other words, an association is made, for the term, between the corresponding portion of the actual phonetic transcription 116 of the term and the substitute pronunciation 122. The pronunciation aligner 108 provides the substitute pronunciation 122 to the confusion matrix manager 114. The confusion matrix manager 114 stores the substitute pronunciation 122 in the confusion matrix database 106.

In some further implementations, the accent group identifier 113 further receives data identifying user characteristics 120 associated with the user. In some examples, the user characteristics 120 are provided by the user, or inferred from public information associated with the user, e.g., through social networking platforms. In some examples, the user characteristics 120 include a geographic location associated with the user, a family name of the user, an origin group the user is associated with, or a like-pronunciation group the user is associated with.

The accent group identifier 113 can generate, or update, an accent identifier (ID) 124 based on the user characteristics 120. For example, for a particular geographic location associated with the user, e.g., a postal code associated with the user or a current city of the user, the accent group identifier 113 can associate a particular accent identifier with the user. In some examples, a user characteristic can be associated with two or more identifiers; and an identifier can be based on two or more user characteristics. In some examples, the accent ID 124 is associated with the substitute pronunciation 122.

The accent group identifier 113 provides the accent ID 124 to the confusion matrix manager 114. The confusion matrix manager 114 stores the accent ID 124 in the confusion matrix database 106. In some examples, the accent ID 124 is assigned to, or associated with, the user. In some examples, the accent ID 124 is assigned to a group of users, the group of users including the user. In some examples, the substitute pronunciation 122 is designated as the substitute pronunciation for the corresponding portion of the actual phonetic transcription 116 for a group of users, the group of users including the user. For example, the group of users can be associated with a similar characteristic, e.g., including a like-pronunciation group. Furthermore, the accent group identifier 113 associates the accent ID 124 with the substitute pronunciation 122. Specifically, the substitute pronunciation 122 for the corresponding portion of the actual phonetic transcription 116 can be associated with the accent ID 124. In some examples, a mapping is generated between the substitute pronunciation 122 and the accent ID 124.

The confusion matrix manager 114 receives the substitute pronunciation 122 from the pronunciation aligner 108 and the accent ID 124 from the accent group identifier 113. The confusion matrix manager 114 can store the substitute pronunciation 122, the accent ID 124, and data of mappings between the substitute pronunciation 122 and the accent 124 in the confusion matrix database 106. Specifically, in some examples, data of a mapping between the substitute pronunciation 122 and the accent ID 124 is stored by the confusion matrix database 106. Additionally, storing of the substitute pronunciation 122 includes storing data of a mapping between the substitute pronunciation 122 and the corresponding portion of the actual phonetic transcription 116 for the term. Thus, for a mapping between the accent ID 124 and the substitute pronunciation 122, there is a further mapping between the substitute pronunciation 122 and the corresponding portion of the actual phonetic transcription 116 for the term.

The system 100 can utilize the confusion matrix database 106 that is generated when the system 100 is in the training mode to obtain a text-based transcription of the user's utterance of a term based on the substitute pronunciation.

In some implementations, additional audio data is received that corresponds to the user speaking an additional term in the natural language. In some examples, the user can be the same user that is associated with the previously received audio data, or can be a different user. Specifically, the accent group identifier 150 receives audio data 160. The audio data 160 can include waveform data of the user speaking the additional term in the natural language. For example, the user speaks the additional term that a mobile computing device detects, e.g., through an audio detection mechanism of the mobile computing device. In some examples, the additional term of the audio data 160 includes the corresponding portion of the actual phonetic transcription 116 as determined when the system 100 is in the training mode. Specifically, the additional term can include phonemes that are substantially the same as phonemes of the corresponding portion of the actual phonetic transcription 116.

In some examples, the accent group identifier 150 further receives data identifying user characteristics 162 associated with the user, similar to the user characteristics 120 when the system 100 is in the training mode. The accent group identifier 150 processes the user characteristics 162, and identifies an accent ID 164 that is associated with the user characteristics 162. For example, the user characteristics 162 can include a geographic location associated with the user, e.g., a postal code associated with the user or a current city of the user, and the accent group identifier 150 identifies the accent ID 164 based on the geographic location of the user. The accent group identifier 150 provides the accent ID 164 to the confusion matrix manager 152.

The confusion matrix manager 152 receives the accent ID 164 from the accent group identifier 150. Additionally, the confusion matrix manager 152 is in communication with the confusion matrix database 106. The confusion matrix manager 152 identifies a substitute pronunciation 166 that is associated with the accent ID 164 for an actual pronunciation of the audio data 160. Specifically, the confusion matrix manager 152 stores data of mappings between accent IDs and substitute pronunciations, and in particular, a mapping between the substitute pronunciation 166 and the accent ID 124. Thus, the confusion matrix manager 152 identifies the substitute pronunciation 166 based on the accent ID 124, and further based on the actual pronunciation of the audio data 160. In some examples, the substitute pronunciation 166 is substantially the same as the substitute pronunciation 122. In some examples, identifying the substitute pronunciation 166 based on the accent ID 124 further includes identifying the corresponding portion of the actual phonetic transcription of the audio data 160 that is associated with the substitute pronunciation 166. The confusion matrix manager 152 provides the substitute pronunciation 166 to the enhanced speech recognizer 154.

The enhanced speech recognizer 154 receives the substitute pronunciation 166 from the confusion matrix manager 152. The enhanced speech recognizer 154 obtains, based on the audio data 160 and the substitute pronunciation 166, a text-based transcription 168 of the audio data 160 corresponding to the user speaking the additional term in the natural language. Specifically, the enhanced speech recognizer 154 includes acoustic models 170, an accent pronunciation manager 172, and language models 174. The enhanced speech recognizer 154 further receives the audio data 160 and the acoustic models 172, based on the audio data 160, obtains an additional actual phonetic transcription of the user speaking the additional term in the natural language.

The accent pronunciation manager 172 identifies an additional portion of the additional actual phonetic transcription that corresponds to the corresponding portion of the actual phonetic transcription 116. Specifically, the additional portion of the additional phonetic transcription can include phonemes that are substantially similar, or the same, to phonemes of the corresponding portion of the actual phonetic transcription 116, as determined when the system 100 is in the training mode. The accent pronunciation manager 172 further replaces the additional portion of the additional actual phonetic transcription with the substitute pronunciation 166 such that the additional phonetic transcription includes the substitute pronunciation 166. The language models 174 obtains, based on the replacement, an updated phonetic transcription of the audio data 160 corresponding the user speaking the additional term in the natural language. That is, the language models 174 generate the text-based transcription 168 of the audio data 160 corresponding to the user speaking the additional term in the natural language based on the updated phonetic transcription.

In some examples, the enhanced speech recognizer 154 provides the text-based transcription 168 to the user interface manager 156. For example, the user interface manager 156 can provide the text-based transcription 168 for display on a graphical display of a mobile computing device. In some examples, the text-based transcription 168 is provided as a search query to a search engine.

Figure 2:
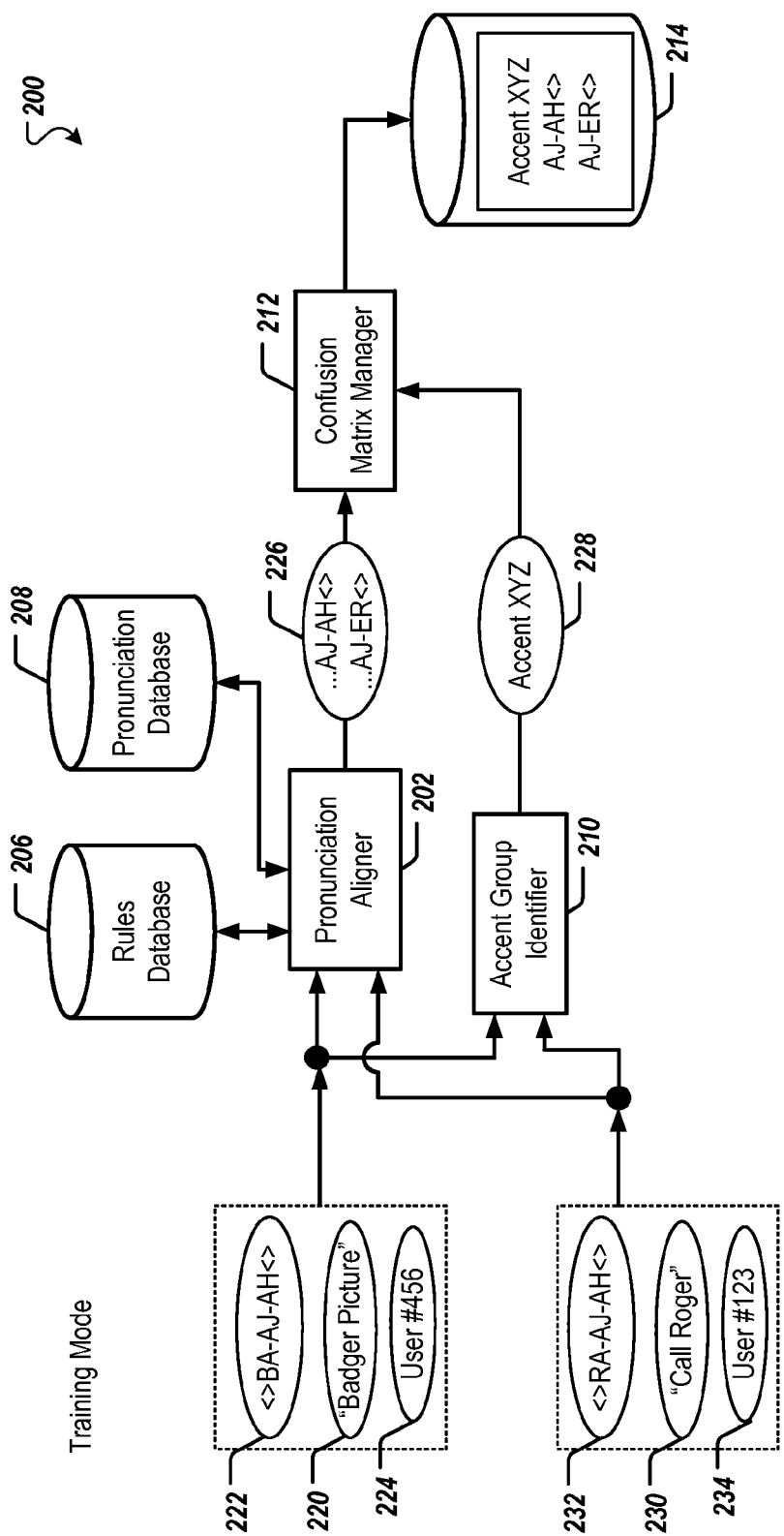
FIG. 2 depicts an example system for identifying a substitute pronunciation.

FIG. 2 illustrates an example system 200 in a training mode. The system 200 includes a pronunciation aligner 204, a rules database 206, a pronunciation database 208, an accent group identifier 210, a confusion matrix manager 212, and a confusion matrix database 214. In some examples, the pronunciation aligner 204 is similar to the pronunciation aligner 108, the rules database 206 is similar to the rules database 110, the pronunciation database 208 is similar to the pronunciation database 112, the accent group identifier 210 is similar to the accent group identifier 113, the confusion matrix manager 212 is similar to the confusion matrix manager 114, and the confusion matrix database 214 is similar to the confusion matrix database 106.

In some examples, the pronunciation aligner 202 receives a text-based transcription 220 of a term "badger;" an actual phonetic transcription 222 of a first user speaking the term "badger" in a natural language; and characteristics 224 associated with the first user. For example, the actual phonetic transcription 222 includes "< >BA-AJ-AH< >" and the characteristics 224 include a first user identifier, e.g., #456. The actual phonetic transaction 222 of "< >BA-AJ-AH< >" includes utterances, e.g., "BA," "AJ," and "AH;" and further includes silences, e.g., "< >." The pronunciation aligner 202 determines an expected phonetic transcription of the term "badger." For example, the pronunciation aligner 204 is in communication with the rules database 206 and the pronunciation database 208 to determine the expected phonetic transcription of the term "badger" of an idealized native speaker of the natural language. Specifically, the pronunciation aligner 202 determines that the expected phonetic transcription of the term "badger" is "< >BA-AJ-ER< >."

The pronunciation aligner 202 aligns the actual phonetic transcription 222 of "< >BA-AJ-AH< >" with the expected phonetic transcription of "< >BA-AJ-ER< >." Based on the alignment, the pronunciation aligner 202 determines that a portion of the expected phonetic transcription "< >BA-AJ-ER< >" is different than a corresponding portion of the actual phonetic transcription 222 of "< >BA-AJ-AH< >." Specifically, the portion "AJ-ER< >" of the expected phonetic transcription differs from the portion "AJ-AH< >" of the actual phonetic transcription 222. That is, a central phoneme of "ER" of the expected phonetic transcription differs from the central phoneme of "AH" of the actual phonetic transcription 222, while the context phonemes of the expected phonetic transcription and the actual phonetic transcription 222 do not differ. The pronunciation aligner 202 designates the portion "AJ-ER< >" of the expected pronunciation as a substitute pronunciation 226 for the corresponding portion "AJ-AH< >" of the actual phonetic transcription 222. The pronunciation aligner 202 provides the substitute pronunciation 226 to the confusion matrix manager 212.

Furthermore, the accent group identifier 210 receives the characteristics 224 of the first user. The accent group identifier 210 identifies the accent ID 228 as an accent XYZ based on the first user characteristics 224, e.g., the first user identifier #456. The accent group identifier 210 provides the accent ID 228 to the confusion matrix manager 212. The confusion matrix manager 212 receives the substitute pronunciation 226 and the accent ID 228. The confusion matrix manager 212 stores a mapping between the substitute pronunciation 226 and the accent ID 228 in the confusion matrix database 214.

Additionally, in some examples, the pronunciation aligner 202 receives a text-based transcription 230 of a term "roger;" an actual phonetic transcription 232 of a second user speaking the term "roger" in a natural language; and characteristics 234 associated with the second user. For example, the actual phonetic transcription 232 includes "< >RA-AJ-AH< >" and the characteristics 234 include a second user identifier, e.g., #123. The actual phonetic transaction 232 of "< >RA-AJ-AH< >" includes utterances, e.g., "RA," "AJ," and "AH;" and further includes silences, e.g., "< >." In some examples, the second user is the first user. The pronunciation aligner 202 determines an expected phonetic transcription of the term "roger." For example, the pronunciation aligner 204 is in communication with the rules database 206 and the pronunciation database 208 to determine the expected phonetic transcription of the term "roger" of an idealized native speaker of the natural language. Specifically, the pronunciation aligner 202 determines that the expected phonetic transcription of the term "roger" is "< >RA-AJ-ER< >."

The pronunciation aligner 202 aligns the actual phonetic transcription 232 of "< >RA-AJ-AH< >" with the expected phonetic transcription of "< >RA-AJ-ER< >." Based on the alignment, the pronunciation aligner 202 determines that a portion of the expected phonetic transcription "< >RA-AJ-ER< >" is different than a corresponding portion of the actual phonetic transcription 232 of "< >RA-AJ-AH< >." Specifically, the portion "AJ-ER< >" of the expected phonetic transcription differs from the portion "AJ-AH< >" of the actual phonetic transcription 232. The pronunciation aligner 202 designates the portion "AJ-ER< >" of the expected pronunciation as the substitute pronunciation 226 for the corresponding portion "AJ-AH< >" of the actual phonetic transcription 232. The pronunciation aligner 202 provides the substitute pronunciation 226 to the confusion matrix manager 212.

Furthermore, the accent group identifier 210 receives the characteristics 234 of the second user. The accent group identifier 210 identifies the accent ID 228 as an accent XYZ based on the second user characteristics, e.g., the second user identifier #123. The accent group identifier 210 provides the accent ID 228 to the confusion matrix manager 212. The confusion matrix manager 212 receives the substitute pronunciation 226 and the accent ID 228. The confusion matrix manager 212 stores a mapping between the substitute pronunciation 226 and the accent ID 228 in the confusion matrix database 214.

Figure 3:
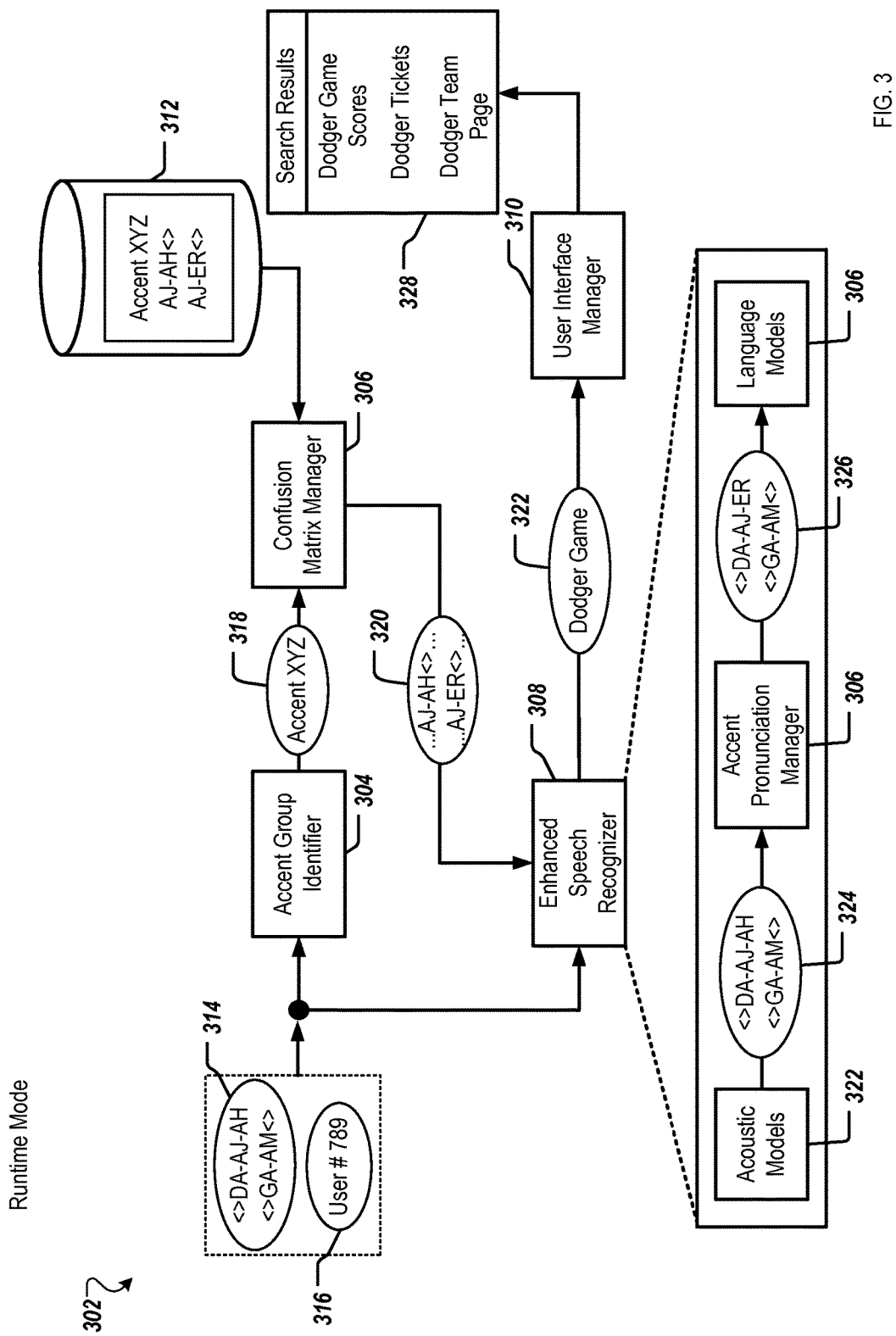
FIG. 3 depicts an example system for replacing a portion of an actual phonetic transcription of a term with a substitute pronunciation.

FIG. 3 illustrates an example system 302 in a runtime mode. The training mode system 302 includes an accent group identifier 304, a confusion matrix manager 306, an enhanced speech recognizer 308, a user interface manager 310, and a confusion matrix database 312. In some examples, the accent group identifier 304 is similar to the accent group identifier 150, the confusion matrix manager 306 is similar to the confusion matrix manager 152, the enhance speech recognizer 308 is similar to the enhanced speech recognizer 154, the user interface manager 310 is similar to the user interface manager 156, and the confusion matrix database 312 is similar to the confusion matrix database 106.

In some examples, the accent group identifier 228 receives an actual phonetic transcription 314 of a user speaking the term "dodger game" in a natural language. For example, the actual phonetic transcription 314 includes "< >DA-AJ-AH< >GA-AM< >." The accent group identifier 304 further receives user characteristics 316 of the user, e.g., the user #789. The accent group identifier 304 identifies an accent ID 318 as an accent XYZ based on the user #789. The accent group identifier 304 provides the accent ID 318 to the confusion matrix manager 306. The confusion matrix manager 306 is in communication with the confusion matrix database 312 to identifying a substitute pronunciation 320 that is associated with the accent ID 318 and the actual phonetic transcription 314. The confusion manager 306 identifies, for the accent ID 318, the substitute pronunciation 320 for the actual phonetic transcription 314. Thus, the confusion manager 306 identifies, for the accent ID 318, a mapping stored by the confusion matrix database 312 between the portion of the actual phonetic transcription 314 of "AJ-AH< >" and the substitute pronunciation of "AJ-ER< >." The confusion matrix manager 306 provides the substitute pronunciation 320 to the enhanced speech recognizer 308.

The enhanced speech recognizer 308 receives the substitute pronunciation 320 and the actual phonetic transcription 314. The enhanced speech recognizer 308 obtains a text-based transcription 322 of the term "dodger game." Specifically, acoustic models 306 of the enhanced speech recognizer 308 obtains an actual phonetic transcription 324 of the term "dodger game" as "<>DA-AJ-AH<>GA-AM<>." An accent pronunciation manager 306 of the enhanced speech recognizer 308 replaces the portion "AJ-AH< >" of the actual phonetic transcription 324 with the substitute pronunciation 320 of "AJ-ER< >" to provide an updated phonetic transcription 326 of "< >DA-AJ-ER< >GA-AM< >." The language models 306 of the enhanced speech recognizer 308 obtains the text-based transcription 322 "dodger game" based on the updated phonetic transcription 326 of "< >DA-AJ-ER< >GA-AM< >." The enhanced speech recognizer 308 provides the text-based transcription 322 to the user interface manager 310.

The user interface manager 310 can appropriately process the text-based transcription 322, including providing the text-based transcription 322 as a search query to a search engine to generate an user interface 328 including search results in response to the search query based on the text-based transcription 322. For example, the search results are based on the term "dodger game," and include results for dodger game scores, dodger tickets, and a dodger team page.

Figure 4:
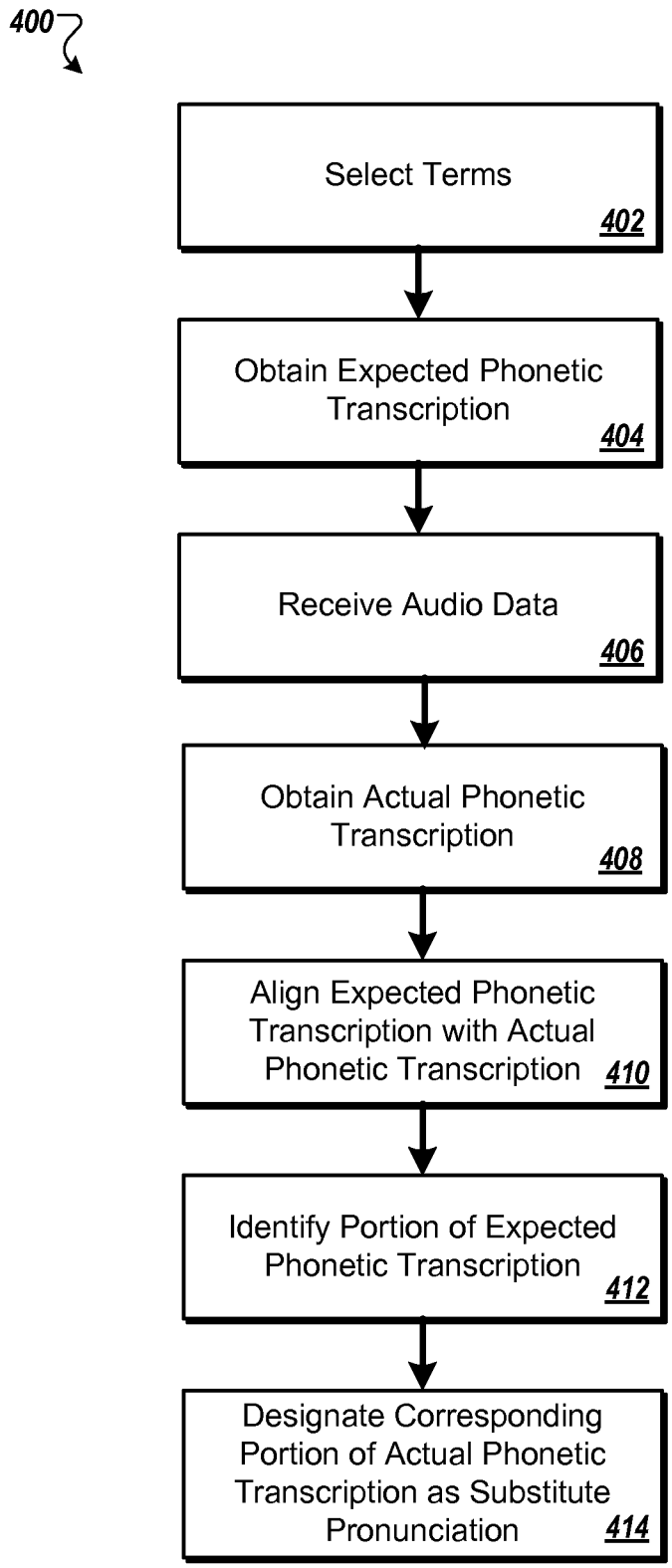
FIG. 4 depicts an example flowchart for identifying a substitute pronunciation.

FIG. 4 depicts a flowchart of an example process 400 for identifying a substitute pronunciation. The example process 400 can be executed using one or more computing devices. For example, the pronunciation aligner 108, the rules database 110, the pronunciation database 112, the accent group identifier 113, the confusion matrix manager 114, and the confusion matrix database 106 can be used to execute the example process 400.

One or more terms are selected (402). An expected phonetic transcription of an idealized native speaker of a natural language speaking the one or more terms is obtained (404). For example, the pronunciation aligner 108 obtains an expected phonetic transcription of the term "badger" as "< >BA-AJ-ER< >." Audio data corresponding to a particular user speaking the one or more terms in the natural language is received (406). For example, the audio data corresponding to the user speaking the term "badger" is received. Based on the audio data, an actual phonetic transcription of the particular user speaking the one or more terms in the natural language is obtained (408). For example, the pronunciation aligner 108 receives the actual phonetic transcription of the term "badger" as "< >BA-AJ-AH< >." The expected phonetic transcription of the idealized native speaker of the natural language is aligned with the actual phonetic transcription of the particular user (410). For example, the expected phonetic transcription of the term "badger" as "< >BA-AJ-ER< >" is aligned with the actual phonetic transcription of the term "badger" as "< >BA-AJ-AH< >." Based on aligning the expected phonetic transcription of the idealized native speaker with the actual phonetic transcription of the particular user, a portion of the expected phonetic transcription that is different than a corresponding portion of the actual phonetic transcription is identified (412). For example, the portion "AJ-ER< >" of the expected phonetic transcription is identified as different from the corresponding portion "AJ-AH< >" of the actual phonetic transcription. Based on identifying the portion of the expected phonetic transcription, the expected phonetic transcription is designated as a substitute pronunciation for the corresponding portion of the actual phonetic transcription (414). For example, the portion "AJ-ER< >" is designated as a substitute pronunciation of the portion "AJ-AH< >."

Figure 5:
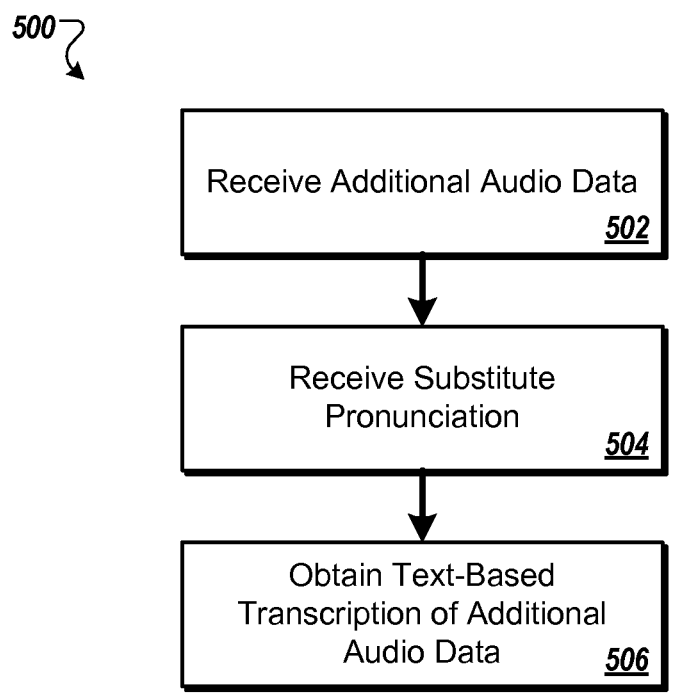
FIG. 5 depicts an example flowchart for replacing a portion of an actual phonetic transcription of a term with a substitute pronunciation.

FIG. 5 depicts a flowchart of an example process 500 for obtaining a text-based transcription of audio data. The example process 500 can be executed using one or more computing devices. For example, the accent group identifier 150, the confusion matrix manager 152, the enhanced speech recognizer 154, the user interface manager 156, and the confusion matrix database 106 can be used to execute the example process 500.

Additional audio data corresponding to the particular user speaking one or more additional terms in the natural language is received (502). For example, the accent group identifier 150 receives audio data associated with the term "dodger game," including the actual phonetic transcription "< >DA-AJ-AH< >GA-AM< >." In some examples, the one or more additional terms include the corresponding portion of the actual phonetic transcription. For example, the term "dodger game" includes a phonetic transcription portion "AJ-AH" that is the same as the corresponding portion of the actual phonetic transcription, e.g., "AJ-AH" of the term "badger." The substitute pronunciation is identified (504). For example, the confusion matrix manager 152 identifies the substitute pronunciation 166. Based on the additional audio data and the substitute pronunciation, a text-based transcription of the additional audio data corresponding to the particular user speaking the one or more additional terms in the natural language is obtained (506). For example, the enhanced speech recognizer 154 obtains, based on the audio data 160 and the substitute pronunciation 166, the text-based transcription 168 of the audio data 160 corresponding to the user speaking the additional terms in the natural language.

Figure 6:
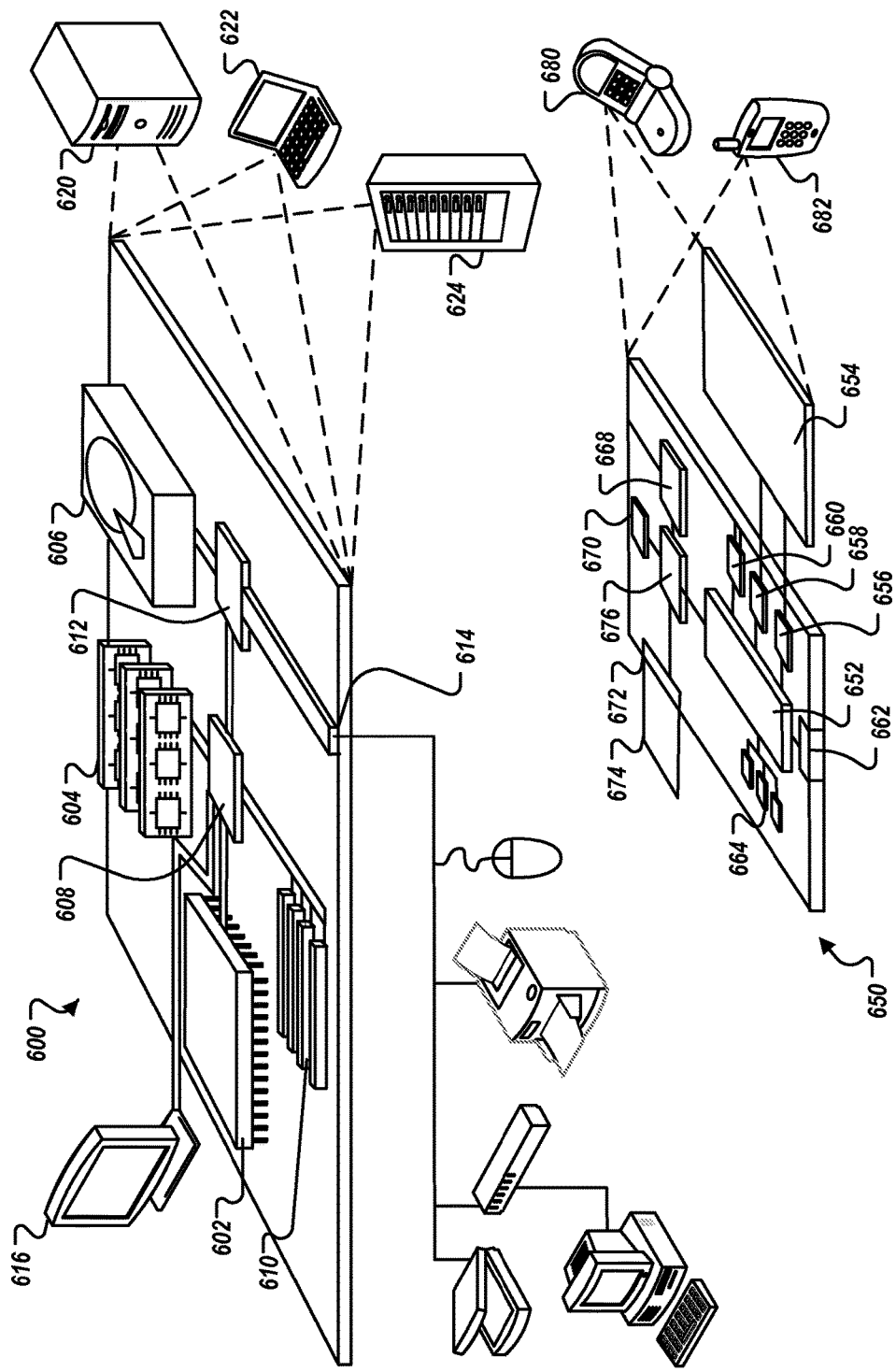
FIG. 6 depicts a computer device and a mobile computer device that may be used to implement the techniques described here.

FIG. 6 shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 may process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 604, the storage device 606, or a memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 may execute instructions within the computing device 640, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 648 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 may be implemented as one or more of a computer-readable medium or media, a volatile memory unit or units, or a non-volatile memory unit or units. Expansion memory 654 may also be provided and connected to device 650 through expansion interface 652, which may include, for example, a SIMM (Single In Line Memory Module) card interface. Such expansion memory 654 may provide extra storage space for device 650, or may also store applications or other information for device 650. Specifically, expansion memory 654 may include instructions to carry out or supplement the processes described above, and may include secure information also. Thus, for example, expansion memory 654 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 654, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 650 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method comprising:

selecting, by a system that includes (i) a confusion matrix manager configured to store, for like-pronunciation groups, phones of expected phonetic transcriptions as substitute pronunciations for corresponding phones of actual phonetic transcriptions in a confusion matrix and (ii) an enhanced speech recognizer configured to obtain, from the confusion matrix manager, using output of an acoustic model associated with the enhanced speech recognizer, the substitute pronunciations before inputting the substitute pronunciations to a language model associated with the enhanced speech recognizer, one or more terms;

obtaining, by the system, an expected phonetic transcription of an idealized native speaker of a natural language speaking the one or more terms;

after obtaining the expected phonetic transcription of the idealized native speaker of the natural language speaking the one or more terms, receiving audio data corresponding to a particular user that is not the idealized native speaker of the natural language speaking the one or more terms in the natural language;

receiving data identifying a like-pronunciation group associated with the particular user;

obtaining, by the system, based on the audio data, an actual phonetic transcription of the particular user that is not the idealized native speaker of the natural language speaking the one or more terms in the natural language;

aligning, by the system, the expected phonetic transcription of the idealized native speaker of the natural language with the actual phonetic transcription of the particular user that is not the idealized native speaker of the natural language;

identifying, by the system, based on aligning the expected phonetic transcription of the idealized native speaker with the actual phonetic transcription of the particular user that is not the idealized native speaker of the natural language, one or more phones of the expected phonetic transcription that is different than one or more corresponding phones of the actual phonetic transcription;

in response to identifying, based on aligning the expected phonetic transcription of the idealized native speaker with the actual phonetic transcription of the particular user that is not the idealized native speaker of the natural language, designating, by the system, the one or more phones of the expected phonetic transcription as a substitute pronunciation for the corresponding phones of the actual phonetic transcription for other terms that (i) are spoken by other users that are also associated with the like-pronunciation group, and (ii) have a respective phonetic transcription that includes the one or more corresponding phones;

obtaining, by the enhanced speech recognizer that is configured to obtain, from the confusion matrix manager, using output of the acoustic model associated with the enhanced speech recognizer, the substitute pronunciations before inputting the substitute pronunciations to the language model associated with the enhanced speech recognizer, a transcription of another term that (i) is spoken by another user that is also associated with the like-pronunciation group, and (ii) has a phonetic transcription that includes the one or more corresponding phones based on the one or more phones of the expected phonetic transcription being designated as a substitute pronunciation for the one or more corresponding phones of the actual phonetic transcription; and inputting, by the enhanced speech recognizer, using the transcription of another term that (i) is spoken by another user that is also associated with the like-pronunciation group, and (ii) has a phonetic transcription that includes the one or more corresponding phones, the one or more phones of the expected phonetic transcription that is designated as the substitute pronunciation for the one or more corresponding phones of the actual phonetic transcription to the language model associated with the enhanced speech recognizer.

2. The computer-implemented method of claim 1, further comprising storing data of a mapping between the substitute pronunciation and the one or more corresponding phones of the actual phonetic transcription for the term in a database.

3. The computer-implemented method of claim 1, wherein selecting further comprises:
   providing, on a user interface, a representation of the one or more terms to the particular user;
   receiving a confirmation from the particular user that the representation of the one or more terms correspond to the actual phonetic transcription; and
   associating the one or more terms with the actual phonetic transcription.

4. The computer-implemented method of claim 3, wherein associating the one or more terms with the actual phonetic transcription further comprises storing data of a mapping between the one or more terms and the actual phonetic transcription in a database.

5. The computer-implemented method of claim 3, wherein the representation of the one or more terms is provided in response to receiving the audio corresponding to the particular user speaking the one or more terms in the natural language.

6. The computer-implemented method of claim 3, wherein the one or more terms include names of one or more contacts of the particular user.

7. The computer-implemented method of claim 1, further comprising:
   generating an identifier based on the like-pronunciation group; and
   associating the identifier with the substitute pronunciation.

8. The computer-implemented method of claim 7, further comprising assigning the identifier to the particular user.

9. The computer-implemented method of claim 7, wherein the like-pronunciation group is associated with one or more of a geographic location, a family name, and an origin group.

10. The computer-implemented method of claim 7, further comprising:
    identifying a mapping between the substitute pronunciation and an actual pronunciation for the one or more corresponding phones of the actual phonetic transcription;
    associating the mapping with the identifier; and
    storing the association and the mapping in the confusion matrix.

11. The computer-implemented method of claim 1, wherein obtaining the expected phonetic transcription further comprises:
    identifying one or more rules associated with the one or more terms; and
    generating the expected phonetic transcription based on the one or more rules.

12. The computer-implemented method of claim 1, wherein obtaining the expected phonetic transcription further comprises:
    identifying a phonetic transcription dictionary, the phonetic transcription dictionary including one or more mappings between one or more terms and one or more expected phonetic transcriptions of the one or more terms; and
    identifying a particular mapping of the one or more mappings of the phonetic transcription dictionary between the one or more terms and the expected phonetic transcription.

13. The computer-implemented method of claim 1, wherein the one or more phones of the expected phonetic transcription corresponds to a sequence of at least three phonemes.

14. The computer-implemented method of claim 1, further comprising:
    receiving additional audio data corresponding to the particular user speaking one or more additional terms in the natural language, the one or more additional terms including the one or more corresponding phones of the actual phonetic transcription;
    identifying the substitute pronunciation; and
    obtaining, based on the additional audio data and the substitute pronunciation, a text-based transcription of the additional audio data corresponding to the particular user speaking the one or more additional terms in the natural language.

15. The computer-implemented of claim 14, further comprising:
identifying the identifier that is associated with the like-pronunciation group; and
based on identifying the identifier that is associated with the like-pronunciation group, identifying the substitute pronunciation associated with the identifier.

16. The computer-implemented method of claim 15, wherein obtaining the text-based transcription of the additional audio data further comprises:
obtaining, based on the additional audio data, an additional actual phonetic transcription of the particular user speaking the one or more additional terms in the natural language;
identifying an additional one or more phones of the additional actual phonetic transcription that corresponds to the one or more corresponding phones of the actual phonetic transcription;
replacing the additional one or more phones of the additional actual phonetic transcription with the substitute pronunciation; and
based on the replacing, obtaining an updated phonetic transcription of the additional audio data corresponding to the particular user speaking the one or more additional terms in the natural language.

17. The computer-implemented method of claim 16, wherein the text-based transcription is a text-based transcription of the updated phonetic transcription of the additional audio data corresponding to the particular user speaking the one or more terms in the natural language.

18. The computer-implemented method of claim 17, further comprising providing the text-based transcription of the updated phonetic transcription of the additional audio data corresponding to the particular user speaking the one or more terms in the natural language to a user interface manager.

19. The computer-implemented method of claim 17, further comprising providing the text-based transcription of the updated phonetic transcription of the additional audio data corresponding to the particular user speaking the one or more terms in the natural language as a search query to a search engine.

20. The computer-implemented method of claim 1, further comprising designating the expected phonetic transcription as the substitute pronunciation for the one or more phones of the corresponding actual phonetic transcription for a particular group of users, the particular group of users including the particular user.

21. A system comprising:
one or more computers and one or more storage devices storing instructions that are operable, when executed by the one or more computers, to cause the one or more computers to perform operations comprising:
selecting, by a system that includes (i) a confusion matrix manager configured to store, for like-pronunciation groups, phones of expected phonetic transcriptions as substitute pronunciations for corresponding phones of actual phonetic transcriptions in a confusion matrix and (ii) an enhanced speech recognizer configured to obtain, from the confusion matrix manager, using output of an acoustic model associated with the enhanced speech recognizer, the substitute pronunciations before inputting the substitute pronunciations to a language model associated with the enhanced speech recognizer, one or more terms;
obtaining, by the system, an expected phonetic transcription of an idealized native speaker of a natural language speaking the one or more terms;
after obtaining the expected phonetic transcription of the idealized native speaker of the natural language speaking the one or more terms, receiving audio data corresponding to a particular user that is not the idealized native speaker of the natural language speaking the one or more terms in the natural language;
receiving data identifying a like-pronunciation group associated with the particular user;
obtaining, by the system, based on the audio data, an actual phonetic transcription of the particular user that is not the idealized native speaker of the natural language speaking the one or more terms in the natural language;
aligning, by the system, the expected phonetic transcription of the idealized native speaker of the natural language with the actual phonetic transcription of the particular user that is not the idealized native speaker of the natural language;
identifying, by the system, based on aligning the expected phonetic transcription of the idealized native speaker with the actual phonetic transcription of the particular user that is not the idealized native speaker of the natural language, one or more phones of the expected phonetic transcription that is different than one or more corresponding phones of the actual phonetic transcription;
in response to identifying, based on aligning the expected phonetic transcription of the idealized native speaker with the actual phonetic transcription of the particular user that is not the idealized native speaker of the natural language, designating, by the system, the one or more phones of the expected phonetic transcription as a substitute pronunciation for the corresponding phones of the actual phonetic transcription for other terms that (i) are spoken by other users that are also associated with the like-pronunciation group, and (ii) have a respective phonetic transcription that includes the one or more corresponding phones;
obtaining, by the enhanced speech recognizer that is configured to obtain, from the confusion matrix manager, using output of the acoustic model associated with the enhanced speech recognizer, the substitute pronunciations before inputting the substitute pronunciations to the language model associated with the enhanced speech recognizer, a transcription of another term that (i) is spoken by another user that is also associated with the like-pronunciation group, and (ii) has a phonetic transcription that includes the one or more corresponding phones based on the one or more phones of the expected phonetic transcription being designated as a substitute pronunciation for the one or more corresponding phones of the actual phonetic transcription; and
inputting, by the enhanced speech recognizer, using the transcription of another term that (i) is spoken by another user that is also associated with the like-pronunciation group, and (ii) has a phonetic transcription that includes the one or more corresponding phones, the one or more phones of the expected phonetic transcription that is designated as the substitute pronunciation for the one or more corresponding phones of the actual phonetic transcription to the language model associated with the enhanced speech recognizer.

22. A non-transitory computer-readable medium storing software comprising instructions executable by one or more computers which, upon such execution, cause the one or more computers to perform operations comprising:

selecting, by a system that includes (i) a confusion matrix manager configured to store, for like-pronunciation groups, phones of expected phonetic transcriptions as substitute pronunciations for corresponding phones of actual phonetic transcriptions in a confusion matrix and (ii) an enhanced speech recognizer configured to obtain, from the confusion matrix manager, using output of an acoustic model associated with the enhanced speech recognizer, the substitute pronunciations before inputting the substitute pronunciations to a language model associated with the enhanced speech recognizer, one or more terms;

obtaining, by the system, an expected phonetic transcription of an idealized native speaker of a natural language speaking the one or more terms;

after obtaining the expected phonetic transcription of the idealized native speaker of the natural language speaking the one or more terms, receiving audio data corresponding to a particular user that is not the idealized native speaker of the natural language speaking the one or more terms in the natural language;

receiving data identifying a like-pronunciation group associated with the particular user;

obtaining, by the system, based on the audio data, an actual phonetic transcription of the particular user that is not the idealized native speaker of the natural language speaking the one or more terms in the natural language;

aligning, by the system, the expected phonetic transcription of the idealized native speaker of the natural language with the actual phonetic transcription of the particular user that is not the idealized native speaker of the natural language;

identifying, by the system, based on aligning the expected phonetic transcription of the idealized native speaker with the actual phonetic transcription of the particular user that is not the idealized native speaker of the natural language, one or more phones of the expected phonetic transcription that is different than one or more corresponding phones of the actual phonetic transcription;

in response to identifying, based on aligning the expected phonetic transcription of the idealized native speaker with the actual phonetic transcription of the particular user that is not the idealized native speaker of the natural language, designating, by the system, the one or more phones of the expected phonetic transcription as a substitute pronunciation for the corresponding phones of the actual phonetic transcription for other terms that (i) are spoken by other users that are also associated with the like-pronunciation group, and (ii) have a respective phonetic transcription that includes the one or more corresponding phones;

obtaining, by the enhanced speech recognizer that is configured to obtain, from the confusion matrix manager, using output of the acoustic model associated with the enhanced speech recognizer, the substitute pronunciations before inputting the substitute pronunciations to the language model associated with the enhanced speech recognizer, a transcription of another term that (i) is spoken by another user that is also associated with the like-pronunciation group, and (ii) has a phonetic transcription that includes the one or more corresponding phones based on the one or more phones of the expected phonetic transcription being designated as a substitute pronunciation for the one or more corresponding phones of the actual phonetic transcription; and inputting, by the enhanced speech recognizer, using the transcription of another term that (i) is spoken by another user that is also associated with the like-pronunciation group, and (ii) has a phonetic transcription that includes the one or more corresponding phones, the one or more phones of the expected phonetic transcription that is designated as the substitute pronunciation for the one or more corresponding phones of the actual phonetic transcription to the language model associated with the enhanced speech recognizer.

* * * * *